US008373738B2

(12) United States Patent
Ishii

(10) Patent No.: US 8,373,738 B2
(45) Date of Patent: Feb. 12, 2013

(54) IMAGE FORMING APPARATUS AND IMAGE FORMING METHOD

(75) Inventor: Koichi Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 577 days.

(21) Appl. No.: 12/618,561

(22) Filed: Nov. 13, 2009

(65) Prior Publication Data

US 2010/0124437 A1 May 20, 2010

(30) Foreign Application Priority Data

Nov. 17, 2008 (JP) ................................ 2008-292965

(51) Int. Cl.
*B41J 2/47* (2006.01)
*H04N 1/405* (2006.01)

(52) U.S. Cl. ........................ 347/255; 347/254; 358/3.19

(58) Field of Classification Search ................. 358/3.19; 347/254, 255
See application file for complete search history.

(56) References Cited

U.S. PATENT DOCUMENTS

| | | | | |
|---|---|---|---|---|
| 5,917,529 | A | 6/1999 | Hotta et al. | |
| 2008/0024587 | A1 | 1/2008 | Nomura et al. | 347/237 |
| 2009/0034006 | A1 * | 2/2009 | Blondal et al. | 358/3.13 |

FOREIGN PATENT DOCUMENTS

| | | | |
|---|---|---|---|
| JP | 09166897 | A | 6/1997 |
| JP | 2001103306 | A | 4/2001 |
| JP | 2004034670 | A | 2/2004 |
| JP | 2006142634 | A | 6/2006 |
| JP | 2008-049692 | | 3/2008 |

* cited by examiner

*Primary Examiner* — Omar Rojas
(74) *Attorney, Agent, or Firm* — DLA Piper LLP (US)

(57) ABSTRACT

An image forming apparatus includes: a latent image bearing member; an exposure head having an imaging optical system and N light-emitting elements (where N is an integer) disposed in a first direction that emit light forming an image upon the latent image bearing member through the imaging optical system; an FM screen whose unit of processing is M in the first direction, M being greater than N; and a controller that performs a screening process on image data using the FM screen.

7 Claims, 11 Drawing Sheets

IMAGE FORMING APPARATUS AND IMAGE FORMING METHOD

BACKGROUND

1. Technical Field

The present invention relates to an image forming apparatus and an image forming method configured to prevent image-quality degradation when performing a screening process on image data.

2. Related Art

Electro-photographic image forming apparatuses have been known in which a latent image is formed upon an image bearing member (photoreceptor) using an exposure head provided with two or more light-emitting elements and an imaging optical system that forms the light from those light-emitting elements into an image. Technology that uses a lens whose optical magnification is negative (ML, or "minus lens") is being developed as such an imaging optical system. JP-A-2008-049692 discloses a line head that uses an ML as its imaging optical system and an image forming apparatus that uses that line head.

In an image forming apparatus that uses a lens array including MLs (MLA), temperature differences arise within the MLA due to rises in the temperatures of the light-emitting elements. Accordingly, unevenness in the darkness of a printed image caused by unevenness in the light intensity occurs when performing a screening process on image data, resulting in degradation of the image quality. Furthermore, there are cases where image-quality degradation occurs due to pitch misalignment between light-emitting elements. In JP-A-2008-049692, there is no mention of measures to be taken in such a case.

SUMMARY

An advantage of some aspects of the invention is an image forming apparatus and an image forming method configured to prevent image-quality degradation when performing a screening process on image data.

An image forming apparatus according to an aspect of the invention includes: a latent image bearing member; an exposure head having an imaging optical system and N light-emitting elements (where N is an integer) disposed in a first direction that emit light forming an image upon the latent image bearing member through the imaging optical system; an FM screen whose unit of processing is M in the first direction, M being greater than N; and a controller that performs a screening process on image data using the FM screen.

In the image forming apparatus according to an aspect of the invention, FM screening is performed using error diffusion or a stochastic dither screen.

The image forming apparatus according to an aspect of the invention has multiple FM screens and, when the number of recording media that have been printed is greater than or equal to a predetermined number, switches the FM screen that is applied.

In the image forming apparatus according to an aspect of the invention, the size of a dot outputted by the FM screen is R in the first direction and 2R in a second direction that is perpendicular to the first direction and thus is R×2R.

In the image forming apparatus according to an aspect of the invention, optical magnification of the imaging optical system is negative, and multiple imaging optical systems are disposed in the first direction.

In the image forming apparatus according to an aspect of the invention, N is greater than or equal to 3.

An image forming method according to an aspect of the invention is an image forming method used in an image forming apparatus, the apparatus including a latent image bearing member and an exposure head having an imaging optical system and N light-emitting elements disposed in a first direction that emit light forming an image upon the latent image bearing member through the imaging optical system, and the method including: setting an FM screen whose unit of processing is M in the first direction, M being greater than N; performing a screening process on image data using the FM screen; printing the screened image data onto a recording medium; determining whether or not a predetermined number of prints has been reached; and changing the FM screen based on the results of the determining.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 11:
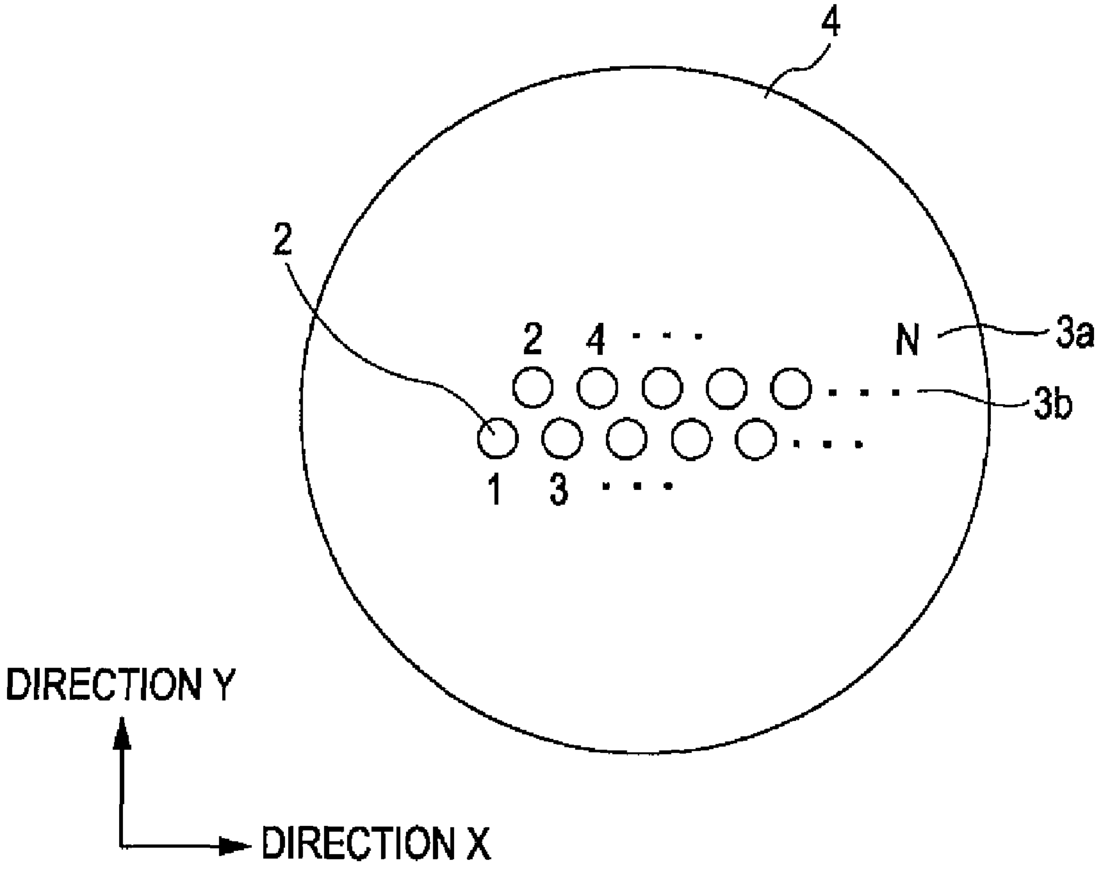
FIG. 11 is a diagram illustrating background art of the invention.

An embodiment of the invention will now be described with reference to the drawings. FIGS. 11 to 14 are diagrams illustrating background art of the invention. FIG. 11 illustrates the disposition relationship between a lens having a negative optical magnification (ML) and light-emitting elements (dots). In ML 4 of FIG. 11, two or more light-emitting elements 2 are disposed in the axial direction (X direction, or a first direction) of a photoreceptor and the rotational direction (Y direction, or a second direction) of the photoreceptor, and a latent image is formed upon the photoreceptor by these light-emitting elements. Note that in the embodiment of the invention, there are cases where the X direction is referred to as the "first direction", and the Y direction is referred to as the "second direction".

For convenience, numbers 1 through N are added to the light-emitting elements 2. In a light-emitting element row 3*a*, which is the first row in the Y direction in FIG. 11, light-emitting elements 2, 4, and so on up to N are disposed from left to right in the X direction in FIG. 11. Meanwhile, in a light-emitting element row 3*b*, which is the second row in the Y direction, light-emitting elements 1, 3, and so on are disposed. Here, a lens array (MLA) is configured by disposing two or more lenses (ML) 4 in the X direction. A lens array (MLA) can also be configured by disposing two or more lenses (ML) in the X and Y directions. The light-emitting elements 2 and N are the light-emitting elements at leading and trailing ends in the X direction of the lens (ML), respectively.

Figure 12A:
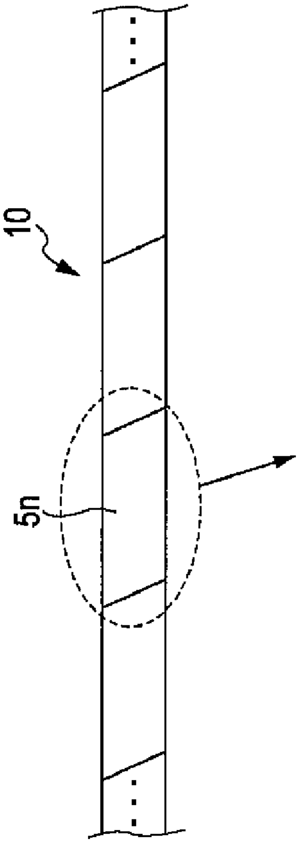
FIGS. 12A and 12B are diagrams illustrating background art of the invention.
Figure 12B:
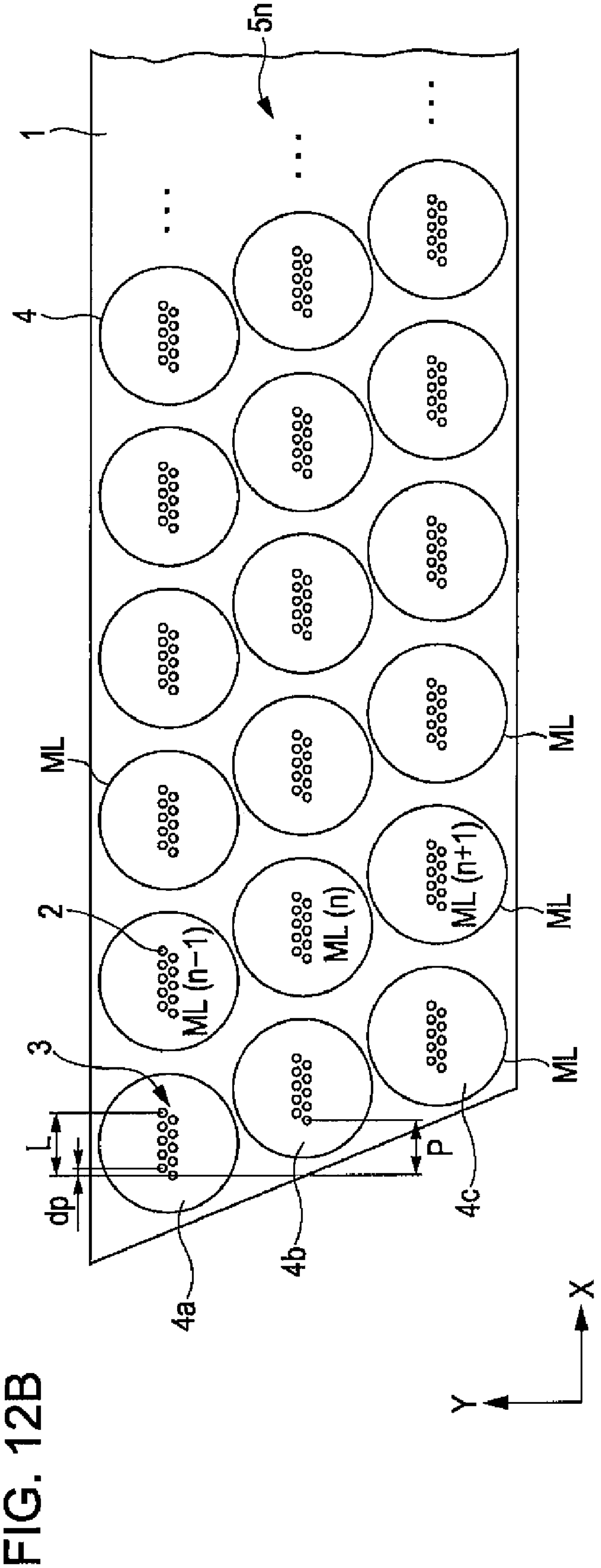

FIGS. 12A and 12B are diagrams illustrating an exposure head using a lens array (MLA). As the number of light-emitting elements (number of dots) for forming one line's worth of a latent image increases in the axial direction of the photoreceptor, an MLA (lens array) that is long in the axial direction of the photoreceptor is necessary. In such a case, a long MLA head can be formed by linking multiple MLAs of a set length.

FIG. 12A illustrates the overall configuration of such a scheme, whereas FIG. 12B schematically illustrates a part of FIG. 12A. FIG. 12A illustrates a long MLA head (exposure head) 10, and 5*n* indicates an MLA that is part of this long MLA head 10. FIG. 12B is a diagram showing an enlarged view of the MLA 5*n*.

In FIG. 12B, the exposure head 10 has two or more light-emitting elements 2 disposed upon a substrate 1. A light-emitting element group 3 includes two or more light-emitting elements 2 disposed in a single lens 4*a*. In the light-emitting element group 3, two or more light-emitting elements are disposed in the axial direction X of the photoreceptor and the rotational direction Y of the photoreceptor. Two or more lenses 4 are disposed in the axial direction (main scanning direction) X of the photoreceptor and the rotational direction (sub scanning direction) Y of the photoreceptor to constitute a lens array (MLA). L in a lens 4*a* represents the width of one row of light-emitting elements 2 disposed in the X direction within a single lens; dp represents the pitch between the light-emitting elements (dots) 2; and P represents the distance between the first dots in the X direction of the lens 4*a* and a lens 4*b* that is adjacent to the lens 4*a* in the Y direction.

Figure 13A:
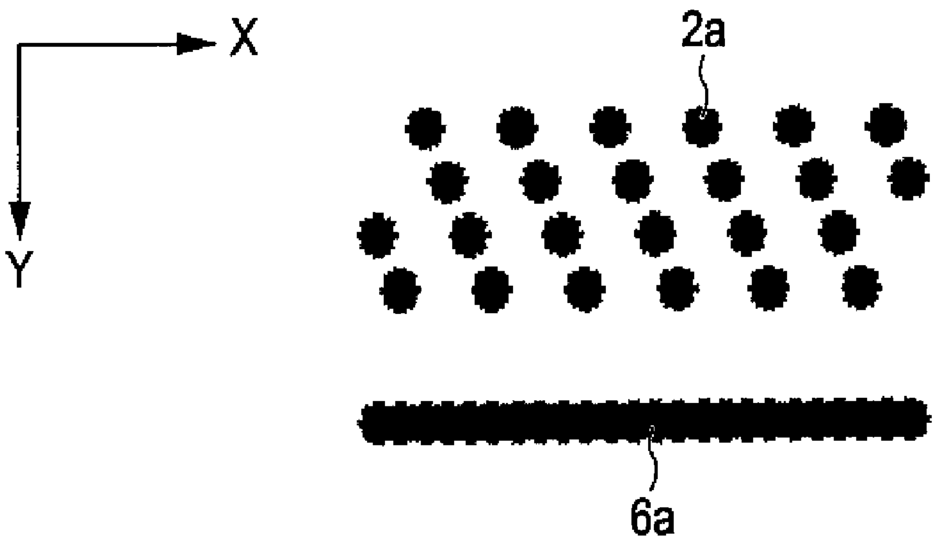
FIGS. 13A and 13B are diagrams illustrating background art of the invention.
Figure 13B:
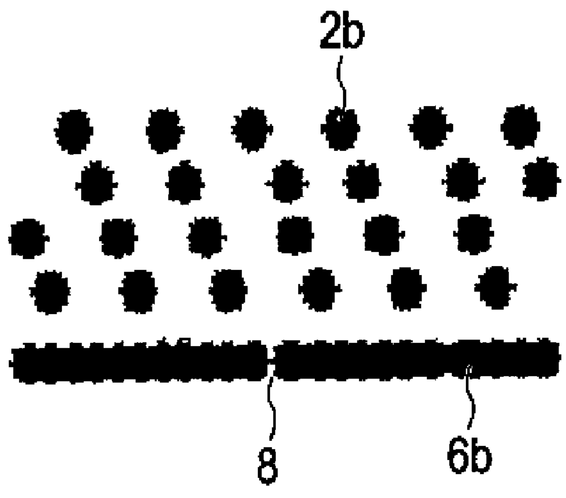

FIGS. 13A and 13B are diagrams illustrating an example of image formation using a lens array (MLA) of an inverted optical system. FIG. 13A illustrates an exposure head in which two or more light-emitting elements 2*a* are disposed, on a substrate, in the main scanning direction (X direction, or the first direction) corresponding to the axial direction of a photoreceptor and the sub scanning direction (Y direction, or the second direction) corresponding to the rotational direction of the photoreceptor. This exposure head has the above-described MLA, not shown in the drawing, and forms image spots 6*a*, which is a single straight line, upon the photoreceptor. As shown in FIG. 13A, there is no misalignment in the pitch between light-emitting elements 2*a*, and therefore ideal image spots 6*a*, having high image quality, are formed. However, FIG. 13B illustrates an example in which there is misalignment in the pitch between light-emitting elements 2*b*, resulting in the formation of a longitudinal line 8 in the second direction in image spots 6*b*. In this manner, when the position of light-emitting elements is fixed upon a substrate, and an image is formed upon a photoreceptor through the MLA while there is pitch error between the light-emitting elements, unevenness in the darkness, longitudinal lines 8, and so on arise due to location misalignment of the image spots formed upon the photoreceptor.

Figure 14A:
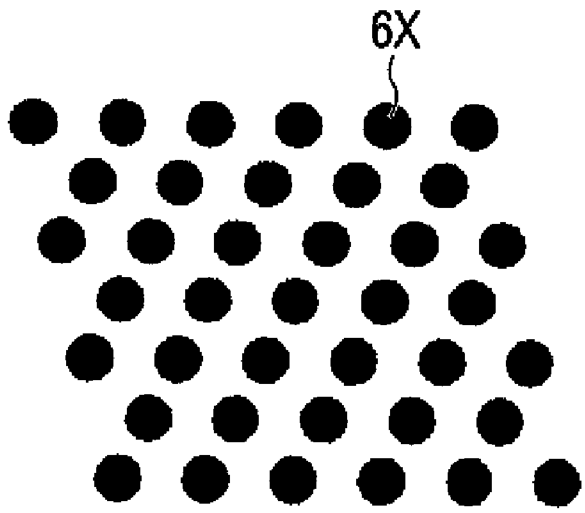
FIGS. 14A and 14B are diagrams illustrating background art of the invention.
Figure 14B:
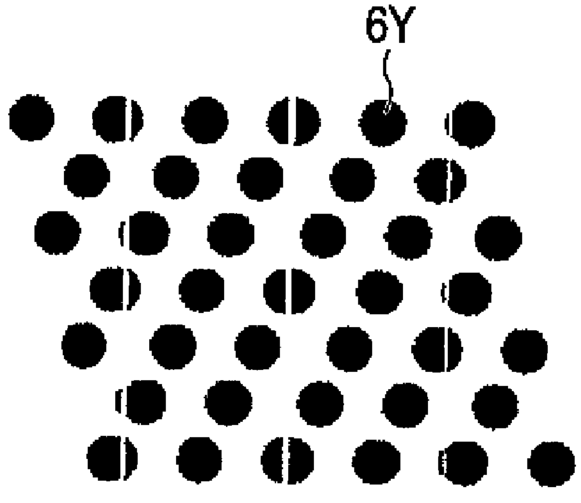

FIGS. 14A and 14B are diagrams illustrating an example of the formation of latent image spots upon a photoreceptor (latent image bearing member) according to an electrophotographic method, when using an exposure head having an MLA, and when processing image data using an AM screen. AM screens express an image through angles and lines. Whether or not specific light-emitting elements are caused to emit light depends on whether or not dots outputted through the screening process are activated. FIG. 14A illustrates the formation of ideal latent image spots 6X resulting from AM screening. Meanwhile, FIG. 14B illustrates an example in which latent image spots 6Y resulting from AM screening are printed in unintended locations due to pitch misalignment between dots.

The examples shown in FIGS. 13A, 13B, 14A, and 14B show that, particularly in the dots at the ends of the lens, the interval between dots increases due to pitch misalignment in the ML, resulting in image-quality degradation such as dot thickening, dot thinning, the occurrence of subjective contours in portions of pitch misalignment, visible vacant lines, and so on. In the case where there is dot arrangement error, such as with an MLA, AM screening (that is, a method that expresses gradations through a low-visibility pattern by using angles and lines to expand the origin points of latent image spots) cannot express the angles and lines with regularity.

Furthermore, light-emitting elements in an MLA experience changes in light intensity due to rises in temperature when emitting light. When light-emitting elements that emit light frequently and light-emitting elements that do not emit light frequently are both present within an ML, temperature unevenness arises, leading to unevenness in the light intensity, which in turn results in unevenness in the darkness. The most significant temperature unevenness occurs between elements that emit light from low-gradation portions and elements that emit light from high-gradation portions due to screening.

Accordingly, with an MLA, the amount of misalignment between dots is great at the ends of MLs. Furthermore, because an AM screen has a regular dot arrangement (that is, processing unit arrangement), misalignments in dot locations in the main scanning direction are highly visible. In an embodiment of the invention, a screening process is performed using an FM screen (a system where the dot size is constant and gradation is expressed based on dot density) that uses a base unit of processing in the main scanning direction (first direction), which is greater than the number N of light-emitting elements within an ML.

Here, definitions are given for terms used in the embodiment of the invention.

(1) Definition 1

Original Image: a printing image prior to screening.

(2) Definition 2

Screen dot: a dot serving as the unit of processing outputted through FM screening (FM screening expresses gradations through dot density).

(3) Definition 3

Regarding the arrangement of light-emitting elements within a single lens (ML) in an MLA: the number of light-emitting elements in each of the Y direction (second direction) and the X direction (first direction) within a single lens may be optional. When the number of light-emitting elements within a single lens is N, N is an integer value greater than or equal to 3. The 1st and Nth dots in FIG. 11 respectively represent the dots on either end of the lens. Latent image dots are formed upon a photoreceptor (latent image bearing member) by the light-emitting elements arranged within the MLs in this manner. Here, a single light-emitting element is assumed to correspond to a single latent image dot.

"Screening" is a technique for expressing halftones using two values, or "on" and "off", for color materials. When using a screening table, data values in the screening table indicate thresholds for turning color materials on or off. For example, for a gradation value of 80 within an original image (a printing image prior to screening), dots whose values in the screening table are 80 or less are set to on, and dots whose values are 81 or more are set to off.

Here, consider a case of high-volume printing, where the same image is continually printed several thousands of times. In such a case, if the starting point of the screening is fixed, and unevenness in the darkness of the printed image occurs due to local rises in temperatures in the MLA, a large difference in darkness, a large color difference, or the like may occur between the first printed result and the final printed result. The invention is used to reduce the occurrence of such a problem. The size of the elements of the screening table in the X direction (first direction) is made larger than the number of light-emitting elements, and after a certain number of prints, the screen is switched and the printing continued.

Figure 1:
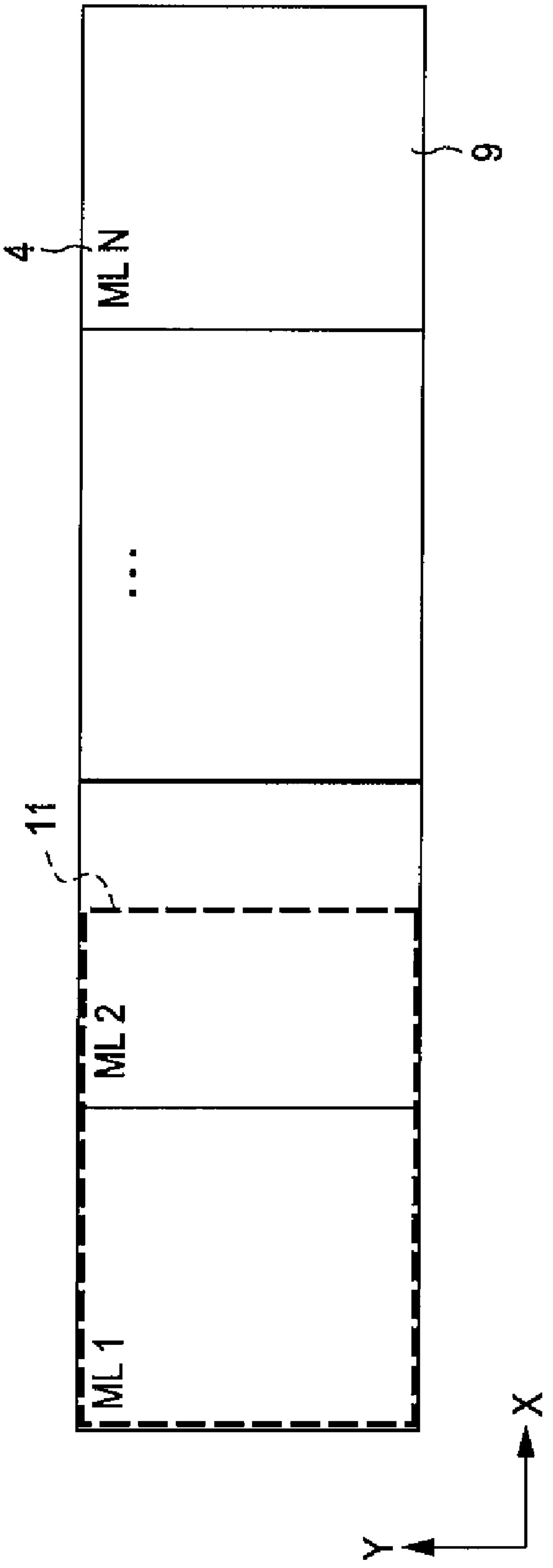
FIG. 1 is a diagram illustrating an embodiment of the invention.

FIG. 1 is a diagram illustrating an embodiment of the invention. In the example shown in FIG. 1, the number of MLs 4 is N (ML1 to MLN). Numeral 9 indicates the location of screened data outputted by each ML onto the photoreceptor. The dotted line portion indicates the location at which error diffusion, or a stochastic dither table, is applied to a screen 11. The processing unit (number of screen elements) M in the main scanning direction (X direction, or the first direction) of the screen is greater than the number of light-emitting elements N within the ML.

Light-emitting elements arranged within an ML 4 and controlled to have low gradation emit light for a longer period than other light-emitting elements, resulting in a local rise in temperature, which in turn leads to unevenness in the light intensity of the light-emitting elements. In order to reduce the occurrence of light intensity unevenness, according to the embodiment of the invention, a screening unit has multiple types of FM screen dither tables, and performs a switching control as described earlier. When using an MLA head as an exposure head, stochastic dithering, as represented by error diffusion, blue noise masking, or the like, is a particularly suitable form of FM screening.

The following can be given as reasons for the above.

(1) If a patterned texture has a portion in which the pattern breaks down, it is extremely apparent, and thus AM screening, non-stochastic dithering, and so on are not suitable. (2) Error diffusion, stochastic dithering, and so on determine the arrangement of output dots dynamically based on the image; therefore, there is no fixed output pattern, and thus the screening does not depend on the number of dots within the lenses. (3) It is possible to use high-frequency dots in order to reduce the visibility of the dot pitch between MLs.

In the embodiment of the invention, error diffusion, stochastic dithering (as represented by blue noise masking and the like) and so on, which are examples of FM screening as described earlier, are used as the screening method for the MLA. In order to reduce the occurrence of longitudinal lines 8 due to misalignment in the dots at the ends of MLs as described with reference to FIG. 13B, the output dots are determined through stochastic screening using a dither table having a size M in the main scanning direction, where M is greater than the number of light-emitting elements N within an ML. Multiple dither tables are prepared, and T (where T is an integer greater than 1) is determined as the number of prints after which the screen is required to be changed. When the number of prints reaches T, the dither table is changed, thereby reducing a rise in temperature in the light-emitting elements within the MLA.

Figure 2:
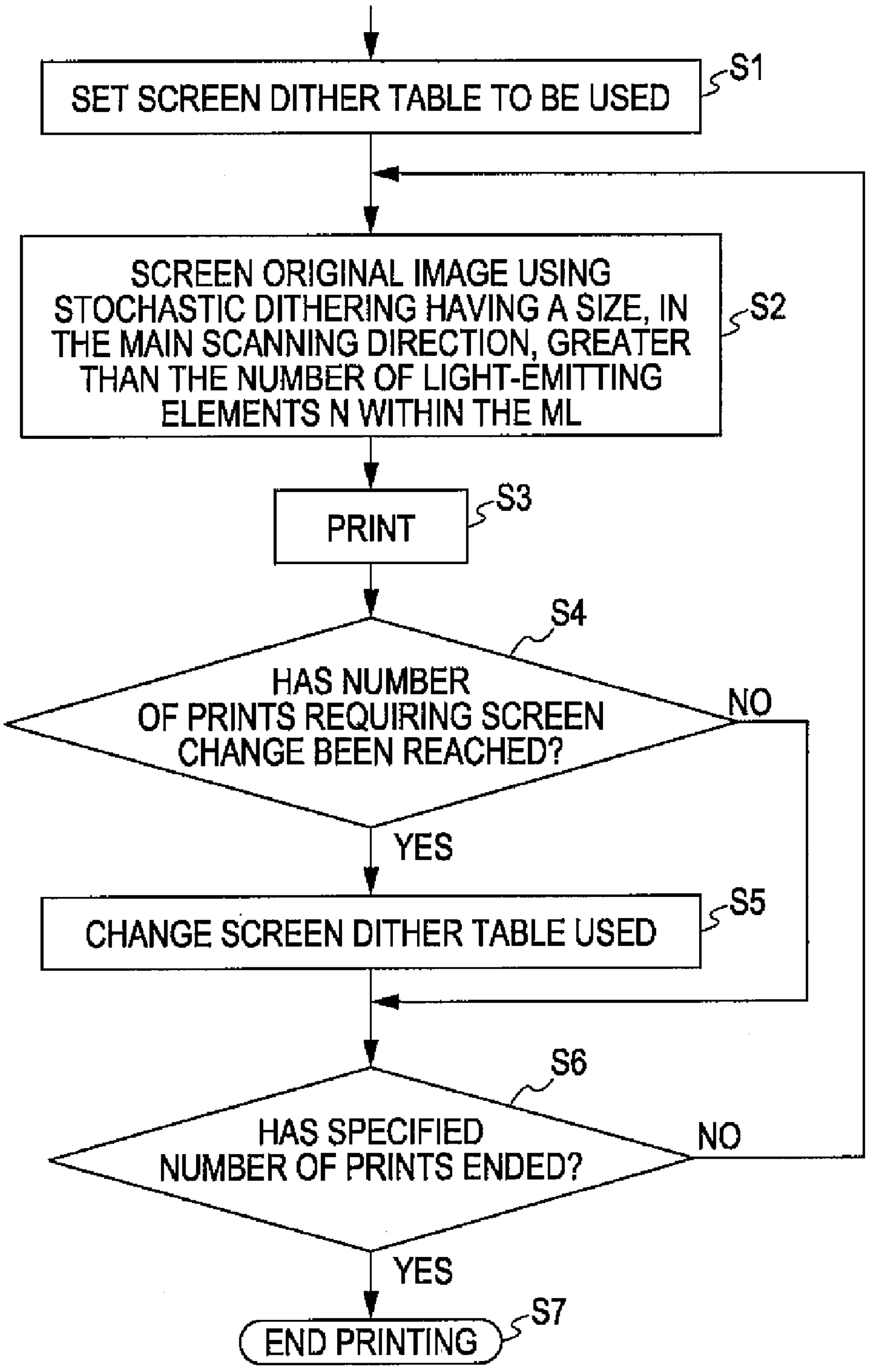
FIG. 2 is a flowchart illustrating an embodiment of the invention.

FIG. 2 is a flowchart illustrating the embodiment of the invention.

S1: setting the screen dither table to be used.

S2: the original image is screened using a stochastic dither table having a size (unit of processing) M in the main scanning direction, where M is greater than the number N of light-emitting elements within MLs.

S3: printing the image onto a recording medium.

S4: determining whether or not the number of prints has reached the number at which a screen change is required. If the determination result is "No", the process advances to S6.

S5: if the determination result in S4 is "Yes", changing the screen dither table being used.

S6: determining whether or not a preset number of prints have ended. If the determination result is "No", the process returns to S2.

S7: if the determination result in S6 is "Yes", the printing ends.

Figure 3A:
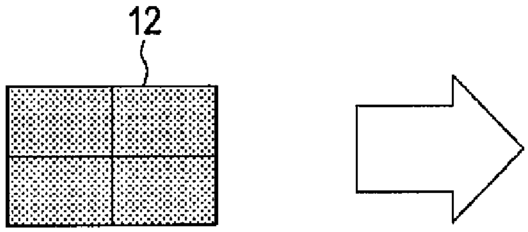
FIGS. 3A and 3B are diagrams illustrating a reference example for the invention.
Figure 3B:
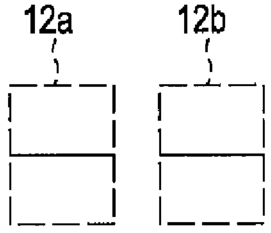

Next, the size of the screen dots (unit of processing) is described. In electrophotographic printing, there are cases where the dot size specified by the screening process cannot be expressed upon paper, due to the static charge of the toner, the fixing conditions, the type of paper being used, and so on. It is assumed that the minimum dot size that a printer can stably output is R×R dots. The "minimum dot size that a printer can stably output" is referred to the size of the minimum dot area at which toner adheres to the surface of paper with certainty. The "minimum dot size that a printer can stably output" is referred to hereinafter as the "isolated dot size". FIGS. 3A and 3B are diagrams illustrating a reference example for the invention. In the case where the maximum pitch misalignment in light-emitting elements arranged within an ML is equivalent to one dot, the size of the screen dot is R×2R. Here, one side (the first direction) of the screen dot is R, and the other side (the second direction) is 2R. The second direction is the direction perpendicular to the first direction. For example, the first direction can be the X direction (main scanning direction) and the second direction can be the Y direction (sub scanning direction). Applying such a screen dot size to an MLA screen enables, in the case where there is pitch misalignment between MLs, instabilities in the dot output to be reduced around the location of the pitch misalignment.

FIGS. 3A and 3B illustrate the case where one side of an isolated dot in a printer is equivalent to two dots. FIG. 3A shows an example in which a latent image spot is expanded in units of isolated dot size by the screening process. Numeral 12 represents a screen dot. In this case, as shown in FIG. 3B, the screen dot 12 is split into 12*a* and 12*b* due to pitch misalignment between MLs, and therefore the toner cannot stably adhere to the surface of paper.

Figure 4A:
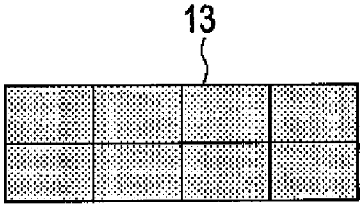
FIGS. 4A and 4B are diagrams illustrating an embodiment of the invention.
Figure 4B:
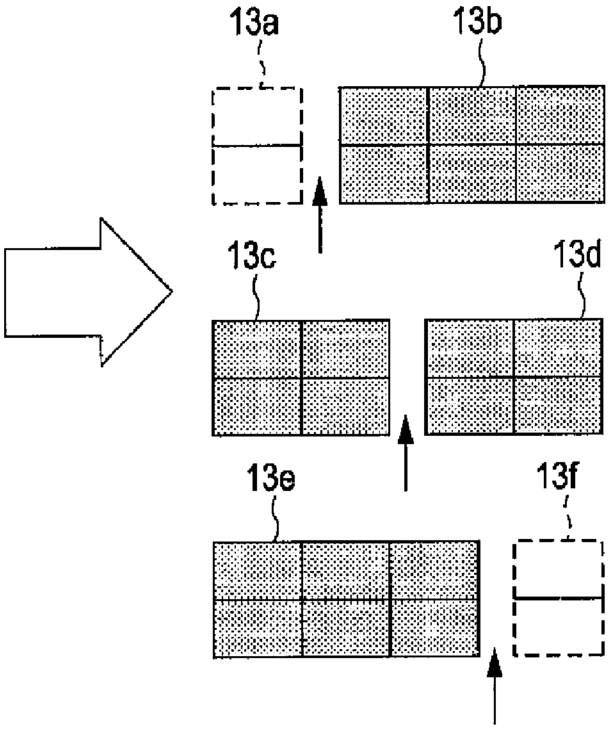

FIGS. 4A and 4B are diagrams illustrating an embodiment of the invention. FIG. 4A shows an example in which a latent image spot is expanded in units of R×2R by the screening process. Numeral 13 represents a screen dot. In this case, as shown in FIG. 4B, even if the screen dot 13 is split into 13*a* to 13*f*, or in other words, even if pitch misalignment between MLs occurs in any of the columns, a dot of the size greater than or equal to the isolated dot size remains, which makes it possible to reduce disappearing dots. For example, if the isolated dot size in the printer is 2×2 dots and the maximum pitch misalignment is one dot, the size of the screen dot is 2×4.

Figure 5:
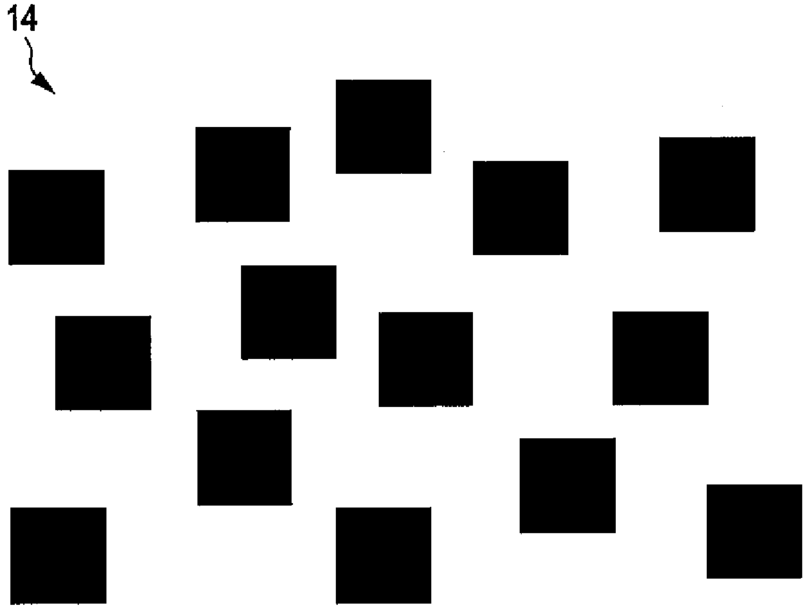
FIG. 5 is a diagram illustrating a reference example for the invention.
Figure 6:
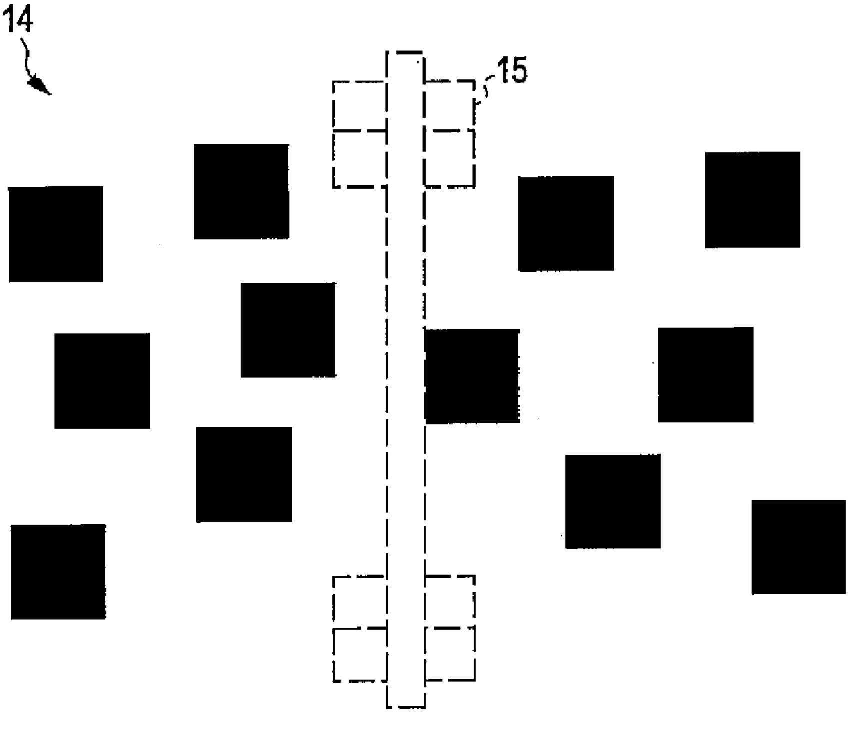
FIG. 6 is a diagram illustrating a reference example for the invention.

FIG. 5 illustrates a reference example of the invention, and shows an image 14 on which FM screening using the isolated dot size has been performed. FIG. 6, meanwhile, illustrates the result of printing in the case where there is pitch misalignment between MLs. As shown in FIG. 6, dots that do not meet the isolated dot size (2×2) (the dotted line portions) due to pitch misalignment between MLs disappear, resulting in white holes 15 and thus influencing the darkness.

Figure 7:
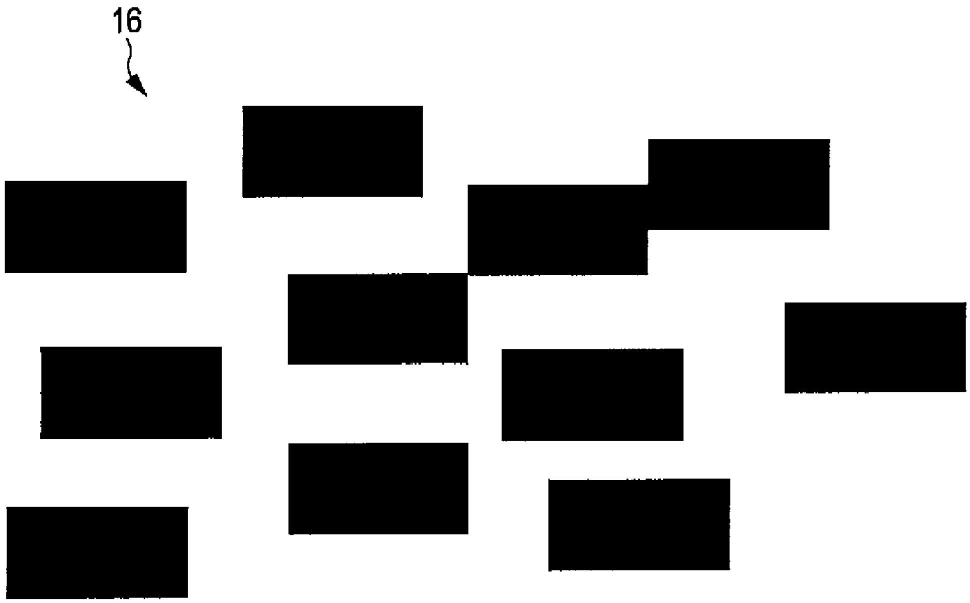
FIG. 7 is a diagram illustrating an embodiment of the invention.
Figure 8:
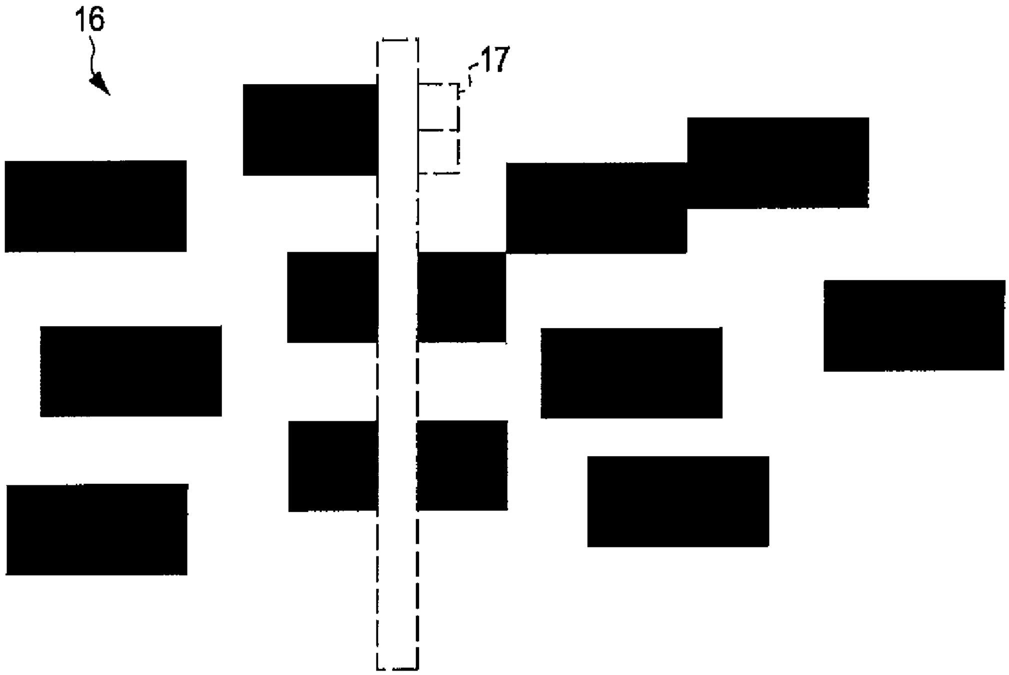
FIG. 8 is a diagram illustrating an embodiment of the invention.

FIG. 7, meanwhile, illustrates the embodiment of the invention, and shows an image 16 resulting from performing FM screening using a screen dot size of 2×4. FIG. 8 is a diagram illustrating an embodiment of the invention. Although dots that do not meet the isolated dot size (2×2) due to pitch misalignment between MLs disappear, the image 16, on which FM screening has been performed using the isolated dot size, has undergone FM screening using a 2×4 dot as a unit, which makes it possible to reduce the influence that a white hole 17 has on the darkness.

Figure 9:
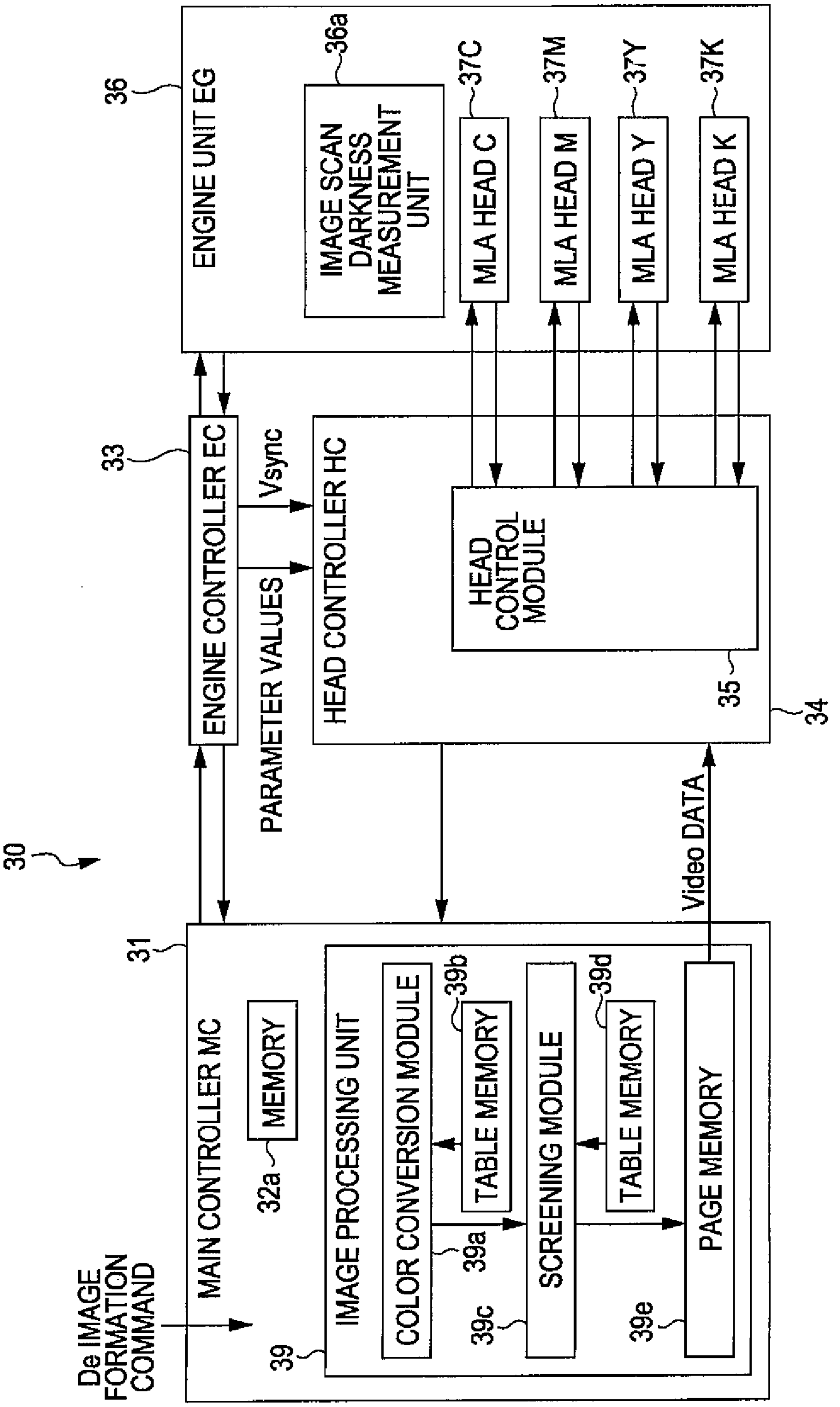
FIG. 9 is a block diagram illustrating an embodiment of the invention.

FIG. 9 is a block diagram illustrating the embodiment of the invention. In FIG. 9, an image forming unit (printer) 30 includes a main controller (MC) 31, an engine controller (EC) 33, a head controller (HC) 34, and an engine unit (EG) 36. Image forming commands are outputted from an external PC or the like serving as a print server (not shown) to the main controller (MC) 31.

The main controller (MC) 31 is provided with a memory 32*a* that stores solid information such as redundant dots of the MLA, a color conversion module 39*a*, and a table memory 39*b* having table data used by the color conversion module 39*a*. The main controller (MC) 31 is also provided with a screening module 39*c*, a table memory 39*d* having table data used by the screening module 39*c*, and a page memory 39*e* that stores print image data. Note that data from the engine controller (EC) 33 and the head controller (HC) 34 is also stored in the memory 32*a*.

The head controller (HC) 34 is provided with a head control module 35. The head control module 35 sends print data to MLA heads 37C, 37M, 37Y, and 37K, corresponding to the four colors C, M, Y, and K. The engine controller (EC) 33 controls the head control module 35 and the engine unit (EG) 36. The engine unit (EG) 36 is provided with an image scan darkness measurement unit 36*a* that scans an image and then measures the darkness thereof.

As shown in FIG. 9, the main controller (MC) 31 transmits printing instructions to the engine controller (EC) 33, creates printing patterns and transmits data (V) stored in the page memory 39*e* to the head controller (HC) 34. The engine controller (EC) 33 controls printing performed by the engine unit (EG) 36. The head controller (HC) 34 transmits print data to the MLA heads 37C to 37K. After printing, the main controller (MC) 31 is notified of the data of an image scanned in the engine unit 36 and the result of the darkness measurement performed on the image. The image scanning and image darkness measurement may be performed by other units in the image forming unit 30, such as, for example, the head controller (HC) 34.

The main controller (MC) 31 determines whether or not the printing result reflects the intentions of the operator based on the received scan data and the darkness measurement data, and feeds the result back to the image forming unit 30. The feedback to the image forming unit 30 results in a change in the values in the color conversion table or, color conversion parameters, or a change in the values in the screen table or screening parameters.

A printing image is formed on the photoreceptor with four lines' worth of an image, from the first to the fourth lines in the rotational direction of the photoreceptor. In this case, the darkness distribution of a printing image obtained by scanning a printing image, which is in turn obtained by causing the MLA to light up on a line-by-line basis, is measured, and the dot locations of the printing image are measured. Then, the results of measuring the dot locations of the printing image are applied to the screen table. This process includes changing the values of color conversion parameters, or changing the values of the screen table or screening parameters.

The above processing is repeated for each line of the MLA. The screen table is thus created by an apparatus having such function. Multiple such screen tables are set for FM screening. A screening process such as that described with reference to the flowchart in FIG. 2 is executed. Furthermore, as described with reference to FIG. 8, a process for preventing image-quality degradation caused by pitch misalignment between MLs is executed. Note that a process for setting the isolated dot size, as illustrated in FIGS. 4A and 4B, is also performed, thereby executing a process for preventing image-quality degradation due to pitch misalignment between MLs.

According to the configuration shown in FIG. 9, the main controller (MC) 31 is provided with a memory 32*a* that stores solid information such as redundant dots in the MLA corresponding to each color. Such a memory 32*a* that stores solid information of the MLA is provided in all of the exposure heads. The number of times a light-emitting element emits light is counted, and this information is sent to the main controller. The main controller stores this information in the memory as MLA information.

Figure 10:
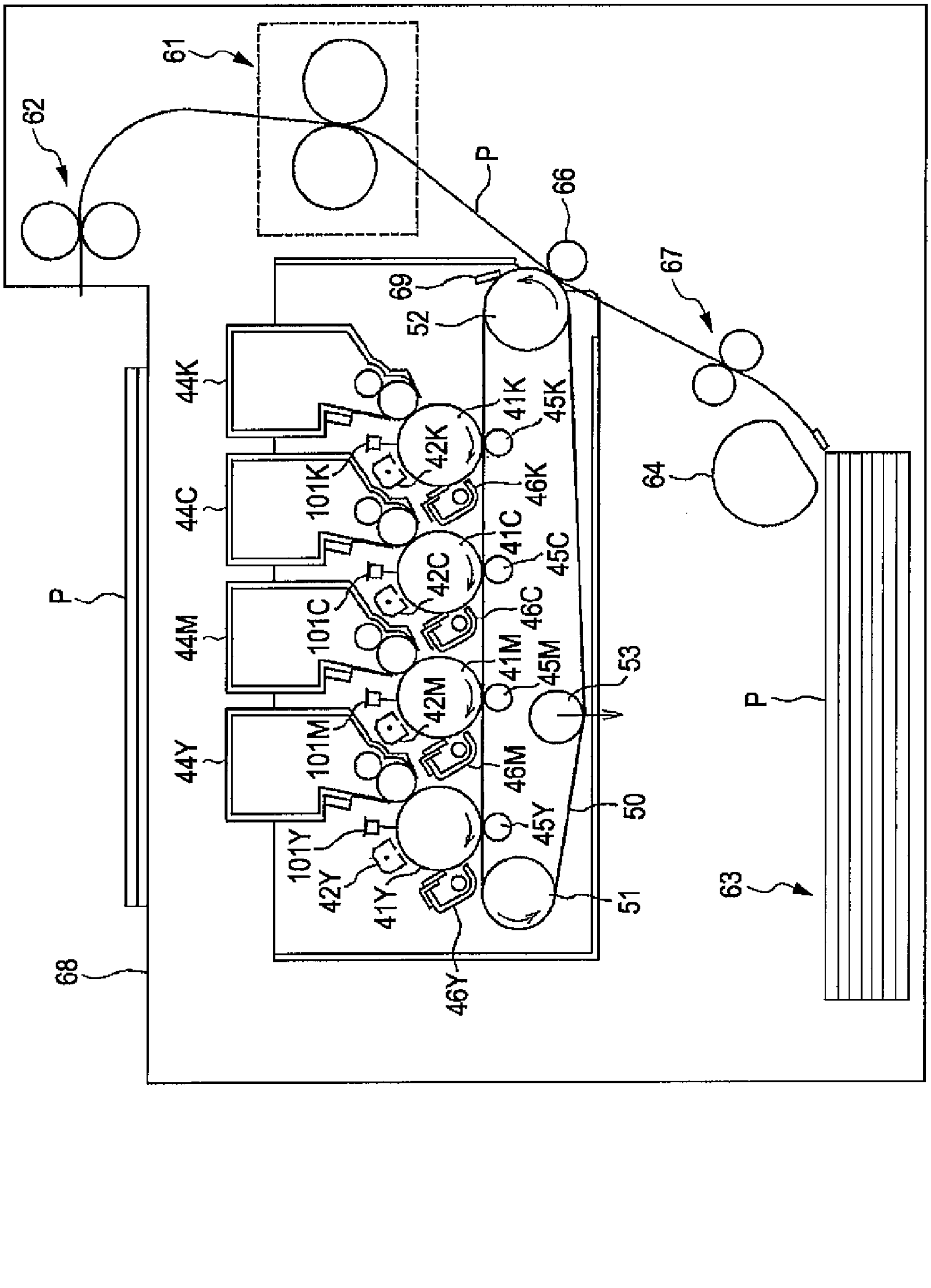
FIG. 10 is a schematic cross-section illustrating the overall configuration of an example of an image forming apparatus according to the invention that uses the electrophotographic process.

According to the embodiment of the invention, line heads in a tandem type color printer (image forming apparatus) is used in which four photoreceptors are exposed by four line heads, thereby forming four color images simultaneously, which are then transferred to a single endless intermediate transfer belt (intermediate transfer member). FIG. 10 is a vertically cross-sectional side view illustrating an example of a tandem type image forming apparatus using organic EL elements as its light-emitting elements. In this image forming apparatus, four line heads 101K, 101C, 101M, and 101Y having identical configurations are disposed at the respective exposure locations of four corresponding photoreceptors (latent image bearing members) 41K, 41C, 41M, and 41Y, also having identical configurations.

As shown in FIG. 10, this image forming apparatus is provided with a driving roller 51, a slave roller 52, and a tension roller 53, and is provided with an intermediate transfer belt 50 that is cyclically driven by the tension roller 53 in the direction of the arrow indicated in FIG. 10 (that is, the counterclockwise direction). The photoreceptors 41K, 41C, 41M, and 41Y are disposed at predetermined intervals relative to the intermediate transfer belt 50. The K, C, M, and Y appended to the end of the aforementioned reference numerals refer to black, cyan, magenta, and yellow, respectively. The photoreceptors 41K to 41Y are rotationally driven in the direction of the arrow indicated in FIG. 10 (that is, the clockwise direction) in synchronization with the driving of the intermediate transfer belt 50. Charging units 42 (K, C, M, and Y) and exposure heads 101 (K, C, M, and Y) are provided in the area around each of the photoreceptors 41 (K, C, M, and Y).

The image forming apparatus further includes developing units 44 (K, C, M, and Y) that develop the electrostatic latent images formed by the exposure heads 101 (K, C, M, and Y) by adding toner, serving as a developing agent, thereto, as well as primary transfer rollers 45 (K, C, M, and Y) and cleaning units 46 (K, C, M, and Y). The light-emission energy peak wavelength of each line head 101 (K, C, M, or Y) and the sensitivity peak wavelength of each photoreceptor 41 (K, C, M, or Y) are set to be approximately the same.

The black, cyan, magenta, and yellow toner images formed by these four single-color toner image formation stations undergo primary transfer in sequence to the intermediate transfer belt 50 as a result of a primary transfer bias being applied to the primary transfer rollers 45 (K, C, M, and Y). Then, a full-color toner image resulting from sequentially superimposing the stated toner images on the intermediate transfer belt 50 undergoes a secondary transfer, by a secondary transfer roller 66, onto a recording medium P such as paper, and is fixed upon the recording medium P by passing through a fixing roller pair 61 serving as a fixing unit. Finally, a discharge roller pair 62 ejects the recording medium P into an ejection tray 68 formed in the upper area of the apparatus.

The image forming apparatus further includes a feed cassette 63 that holds a stack of multiple sheets of the recording medium P; a pickup roller 64 that transports the recording medium P, one sheet at a time, from the feed cassette 63; a gate roller pair 67 that regulates the timing at which the recording medium P is fed to a secondary transfer unit of the secondary transfer roller 66; the secondary transfer roller 66, serving as a secondary transfer member that, along with the intermediate transfer belt 50, forms the secondary transfer unit; and a cleaning blade 69 that removes toner remaining on the intermediate transfer belt 50 following the secondary transfer.

In the case where an organic EL is used as the light source (as with an OPH=OLED Printer Head), there is a marked degradation depending on the light-emission time of the elements, which causes a drop in the amount of light. If the light amount is insufficient, the photoreceptor cannot be sufficiently discharged; as a result, toner does not adhere thereto, resulting in print results with insufficient darkness or missing colors. However, even in such a case, moving the origin point locations through the screen shift according to the invention makes it possible to prevent unevenness in the light-emission times of light-emission elements, thereby reducing localized insufficient light amounts.

Although an image forming apparatus and image forming method according to the invention, which suppress image-quality degradation, and the principles thereof have been described based on an embodiment, the invention is not intended to be limited to the aforementioned embodiment, and various modifications can be made thereto.

The entire disclosure of Japanese Patent Applications No. 2008-292965, filed on Nov. 17, 2008 is expressly incorporated by reference herein.

What is claimed is:

1. An image forming apparatus comprising:

a latent image bearing member;

an exposure head having an imaging optical system and N light-emitting elements (where N is a non-zero integer) disposed in a first direction that emit light forming an image upon the latent image bearing member through the imaging optical system;

an FM screen whose unit of processing is M in the first direction, M being greater than N; and a controller that performs a screening process on image data using the FM screen, wherein the apparatus has multiple FM screens and, when the number of recording media that have been printed is Greater than or equal to a predetermined number, switches the FM screen that is applied.

2. The image forming apparatus according to claim 1, wherein the FM screening is performed using one of error diffusion and a stochastic dither screen.

3. An image forming apparatus comprising:

a latent image bearing member;

an exposure head having an imaging optical system and N light-emitting elements (where N is a non-zero integer) disposed in a first direction that emit light forming an image upon the latent image bearing member through the imaging optical system;

an FM screen whose unit of processing is M in the first direction, M being greater than N; and a controller that performs a screening process on image data using the FM screen, wherein the size of a dot outputted by the FM screen is R in the first direction and 2R in a second direction that is perpendicular to the first direction and thus is R×2R.

4. The image forming apparatus according to claim 1, wherein optical magnification of the imaging optical system is negative, and multiple imaging optical systems are disposed in the first direction.

5. The image forming apparatus according to claim 1, wherein N is greater than or equal to 3.

6. An image forming method used in an image forming apparatus, the apparatus including a latent image bearing member and an exposure head having an imaging optical system and N (where N is a non-zero integer) light-emitting elements disposed in a first direction that emit light forming an image upon the latent image bearing member through the imaging optical system, and the method comprising:

setting an FM screen whose unit of processing is M in the first direction, M being greater than N;

performing a screening process on image data using the FM screen;

printing the screened image data onto a recording medium;

determining whether or not a predetermined number of prints has been reached; and changing the FM screen based on the results of the determining.

7. The image forming apparatus according to claim 1, wherein the size of a dot outputted by the FM screen is R in the first direction and k×R (where k is an integer and K≧2) in a second direction that is perpendicular to the first direction and thus R×k×R.

* * * * *